April 7, 1959 F. E. APA ET AL 2,881,377
PHASE CONTROL SYSTEM FOR A ROTATING MEMBER
Filed Nov. 19, 1954 10 Sheets-Sheet 1

Inventors
Frank E. Apa
Alfred W. Torrible
By Luis Beruat
Attorney

April 7, 1959 F. E. APA ET AL 2,881,377
PHASE CONTROL SYSTEM FOR A ROTATING MEMBER
Filed Nov. 19, 1954 10 Sheets-Sheet 9

Fig. 11.

Inventors
Frank E. Apa
Alfred W. Torrible
By Louis Bernat
Attorney

April 7, 1959     F. E. APA ET AL     2,881,377
PHASE CONTROL SYSTEM FOR A ROTATING MEMBER
Filed Nov. 19, 1954     10 Sheets-Sheet 10

United States Patent Office 2,881,377
Patented Apr. 7, 1959

2,881,377

PHASE CONTROL SYSTEM FOR A ROTATING MEMBER

Frank E. Apa, Camarillo, Calif., and Alfred W. Torrible, Alamogordo, N. Mex., assignors to Land-Air, Inc., a corporation of Illinois Application November 19, 1954, Serial No. 470,002

11 Claims. (Cl. 318—175)

This invention relates to a system to control the phase position of a rotating member to a predetermined relationship with a timing pulse of repetition rate corresponding to the speed of rotations of the member.

In numerous applications of rotating members it is desired to cause the member to rotate at a desired speed of rotation and, in addition, to maintain the member at a predetermined phase position at that speed of rotation. For example, in certain high speed camera applications exposure is made through the window of a rotating shutter so that the sensitized film is exposed to the viewed object only when the window on the shutter is registered with the fixed camera lens. If the shutter is rotated in synchronism with a periodic timing signal—and in addition is held at a fixed mechanical phase position in relation to that signal—the film will be exposed through the shutter periodically and at exact time phase position with respect to the timing signal. By coordinating a number of cameras so controlled so that the cameras are exposed at successive phase positions in relation to the signal it is possible to provide a sequence of successive timed exposures of the respective films. Moreover, if the films themselves are moved during the masking interval a series of exposures can be taken. The net result is to provide a series of exposures in sequence, the exposures of each camera having a fixed phase relation to the timing signal and the exposures of all the cameras taken together providing a series of pictures at successive instants of time more closely spaced than would be possible with any one camera alone.

The operations of a camera mechanism of the above type—as well as many other types of apparatus—depends upon exactly maintaining the phase position of rotating shafts. The apparatus of the present invention provides an accurate control for this purpose. In brief, the apparatus utilizes a source of periodic reference or control voltage pulses in conjunction with a pickup device to generate one pulse each time the rotating shaft passes a fixed phase position. The latter generates the controlled pulse which is compared in time with the control voltage pulse. The time comparator mechanism develops a signal having sense determined by which of the two pulses is first in time and having length determined by the time interval between the leading edges of the pulses. This signal is converted to a signal of sense likewise determined by which of the pulses is first but having its magnitude determined by the time interval between the leading edges of the pulses. The latter signal drives a servo motor which in turn operates a differential selsyn unit to control the phase of the balanced polyphase voltages applied to the polyphase synchronous motor used to drive the shaft. The entire mechanism is arranged to that the phase variations of the polyphase voltages applied to the synchronous motor are of direction to restore the shaft to the desired phase position in relation to the control pulses.

The structure described herein further includes mechanism to hold the servo motor in a constant state of "dither" or small cyclical movement to avoid static friction. Also means is provided to condition the entire system for each successive pair of pulses without destroying the linearity of the relation between servo motor torque and shaft phase error.

In accordance with a further embodiment of the present invention the above operation is achieved by the use of magnetic relays.

It is therefore a general object of the present invention to provide an improved system to maintain a rotating member, such as a shaft, in desired phase position.

Another object of the present invention is to provide an improved system of the foregoing type in which static friction is avoided.

Still another object of the present invention is to provide an improved system for controlling the phase position of a rotating member which is controlled by the joint action of a periodic control pulse and by a controlled pulse generated by the shaft as it rotates.

It is yet another object of the present invention to provide an improved control system to maintain a synchronously rotating shaft in a desired phase position which operates by controlling the phase of the balanced polyphase voltages applied to a polyphase synchronous drive motor.

An additional object of the present invention is to provide an apparatus of the foregoing type in which the requisite control operations are achieved by the use of magnetic control relays.

The novel features which we believe to be characteristic of the present invention are set forth with particularity in the appended claims. Our invention itself, however, both as to its organization and method of operation, together with further objects and advantages thereof, will best be understood by reference to the following description taken in connection with the accompanying drawings, in which:

Figure 4 is a more detailed block diagram of the time phase comparator showing wave shapes;

The overall control system

Figure 1:
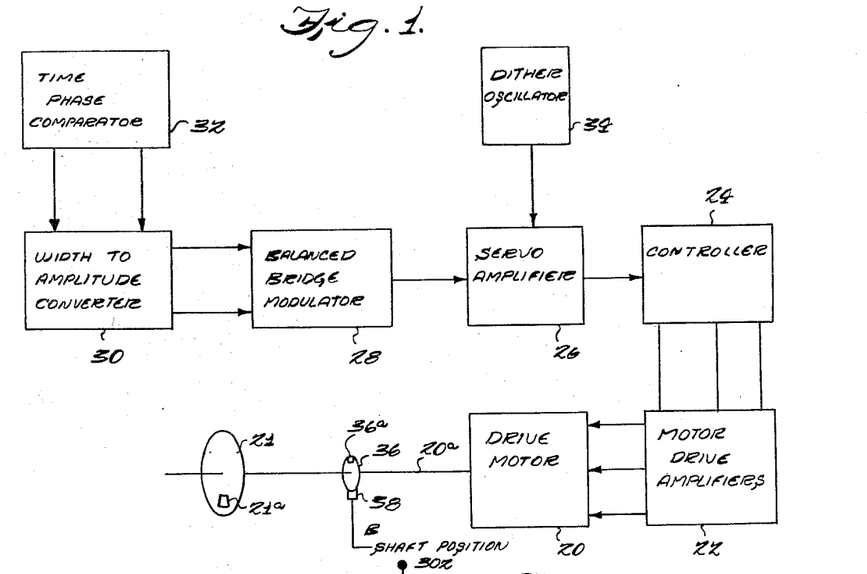
Figure 1 is a block diagram of the overall control mechanism.

The block diagram of Figure 1 shows the general arrangement of the overall motor control system herein described. The shaft driving motor is indicated at 20 and is driven by the amplifiers 22 which supply 3 phase alternating current of controlled phase. The motor 20 is a synchronous motor and accordingly follows, both as to frequency and phase, the alternating current supplied to it. The phase of the alternating current delivered by the amplifiers 22, is determined by the controller 24, hereinafter described in detail.

In brief, this controller consists of a 3 phase synchro differential generator having a wound rotor and wound stator, whose relative position of rotation is controlled by the servo amplifier 26. The rotor is fed with balanced three phase voltage from a phase splitter and the stator feeds the amplifiers 22.

The modulator 28 supplies the servo amplifier 26 with alternating servo driving voltage having phase determined by the lag or lead of the shaft 20a of the motor 20 in relation to the desired position and value determined by the extent of the lag or lead as the case may be. The control signal for modulator 28 is in turn derived from the width to amplitude converter 30. This converter receives a signal from the time-phase comparator 32 which is responsive to the shaft position indicating pulses and to the control pulses.

The overall system thus senses the time position of the shaft position pulses in relation to the control pulses; converts the time spacing of these respective pulses to a signal of amplitude determined by the extent of the time spacing; supplies A.-C. current to the servo 26 in accordance with the phase and extent of such time spacing; generates three phase alternating current of phase determined by the time spacing and relative positions of the shaft position and control pulses; and applies the three phase current to the drive motor to complete the closed cycle control system.

The dither oscillator 34 supplies a small alternating disturbing voltage to the servo amplifier 26 to cause the servo motor of controller 24 to be in continuous motion and hence subject to moving rather than static friction.

The shaft position pulse is generated by the disk 36 which is located on the shaft 20a of the motor 20. This disk has a steel slug 36a imbedded in its periphery. The magnetic pickup 38 is positioned adjacent the periphery of the disk 36 so that a sharply peaked alternating voltage pulse is generated in the pickup 38 each time the slug 36a goes past the pickup 38. The time position of this pulse is determined by the phase of the shaft 20a as it rotates.

The shaft 20a carries the mask or shutter 21 having a window 21a through which the camera (not shown) is exposed. The shutter 21 is positioned on the shaft 20a in such position that the camera is exposed at the instant the slug 36a passes over the magnetic pickup 38 to generate the controlled voltage pulse.

The camera motor 20 is a three phase synchronous motor. It may, for example, have a rotor with permanent field magnets or it may have an energized rotor field structure. In either event, the characteristic of a synchronous motor of this kind is to rotate at the same angular velocity as the rotating magnetic field created by voltage applied to the windings, and to lag the magnetic field to an extent determined by the mechanical load on the motor. Since a variation in the phase of the three phase supply current varies the phase position of the rotating magnetic field—and the mechanical load on the motor does not vary significantly—the phase position of the motor shaft 20a is controlled by the phase position of the alternating voltages supplied to the motor. As is described in further detail hereafter, the position of the rotor of the motor 20 follows variations in the phase of the supply voltage very rapidly and with very little tendency to overshoot.

The time phase comparator

Figures 2, 3, 3A:
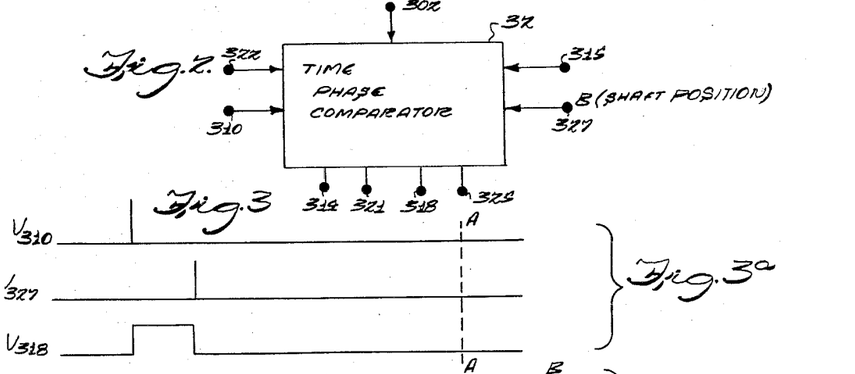
Figure 2 is a diagrammatic showing in block form of the time phase comparator mechanism.
Figure 3a is a diagram showing the time relationship of the pulses applied to and produced the time phase comparator when the control pulse leads the controlled pulse.
Figure 2:
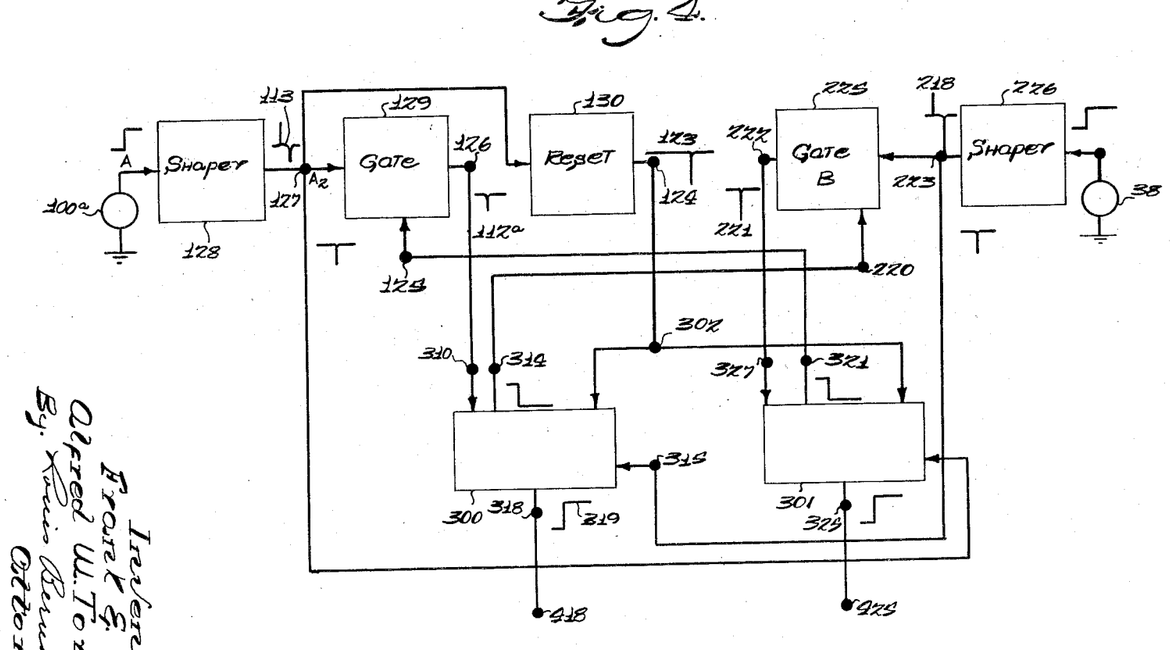

Fig. 2 is a block diagram identifying the voltages applied to and taken from the time phase comparator. These voltages include the shaped control or reference time pulse applied to terminal 310 (Figures 2, 4 and 7). This pulse is a delayed pulse from the reference pulse source 100a, Figures 4 and 5, and appearing also at terminal 126, Figures 4 and 5. The shaft position voltage pulse is applied to terminal 327, Figures 2, 4 and 7. This pulse is the induced voltage in the magnetic pickup 38 as shaped and delayed by the circuit of Figure 6. It also appears at terminal 223, Figures 4 and 6. The voltage applied to terminal 302, Figures 2, 4 and 7, is a reset voltage derived from the reference pulse shaping system of Figure 5 (and appearing at terminal 124). This pulse is substantially midway between successive reference pulses and restores the time phase comparator to the signal-receiving condition.

Two types of output signals are derived from the time phase comparator. The first type of signals appear at terminals 314 and 321, Figures 2, 4 and 7, and are applied to terminals 220, Figures 4 and 6, and 125, Figures 4 and 5, respectively, to disable the pulse shaping circuit as hereinafter described. The other output voltages appear at terminals 318 and 325, Figures 2, 4 and 7. If the pulse from the control source (100a) Figure 4, leads the pulse from the controlled source (magnetic pickup 38), an output voltage pulse appears at terminal 318. On the other hand, if the controlled source (pickup 38) leads the control source (100a), Figure 4, an output voltage pulse appears at terminal 325. In either event the duration of the output pulse is determined by the extent of the phase displacement.

In addition to the foregoing, pulse termination voltages are applied to the time pulse comparator at terminals 322 and 315. The former is derived from terminal 127, Figure 5, and the latter is derived from terminal 223, Figures 4 and 6. These voltages serve to terminate the pulse commenced by the first pulse to be applied to the time phase comparator.

Figure 3a shows the voltages at terminals 310 ($V_{310}$), 327 ($V_{327}$) and 318 ($V_{318}$) when the control pulse leads the controlled pulse. Under this condition the reset voltage resets the time phase comparator at time A—A, which is halfway between the successive pulses at terminal 310 ($V_{310}$).

Figure 3B:
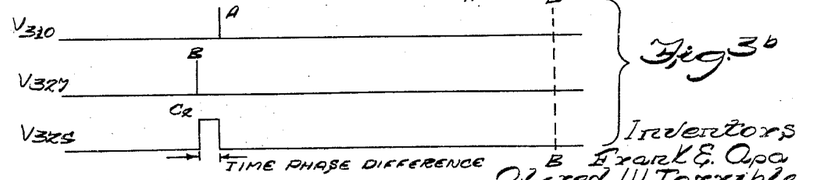
Figure 3b is a similar diagrammatic showing of the time relationship of the pulses when the controlled pulse leads the control pulse.

Figure 3b shows the voltages at terminals 310 ($V_{310}$), 327 ($V_{327}$), and 325 ($V_{325}$) when the controlled pulse leads the control pulse. Under this condition the reset voltage occurs at time B—B, which is halfway between successive pulses at terminal 310 but, as shown, is somewhat delayed in relation to the controlled voltage pulse ($V_{327}$) in relation to the condition of Figure 3a.

Figure 5:
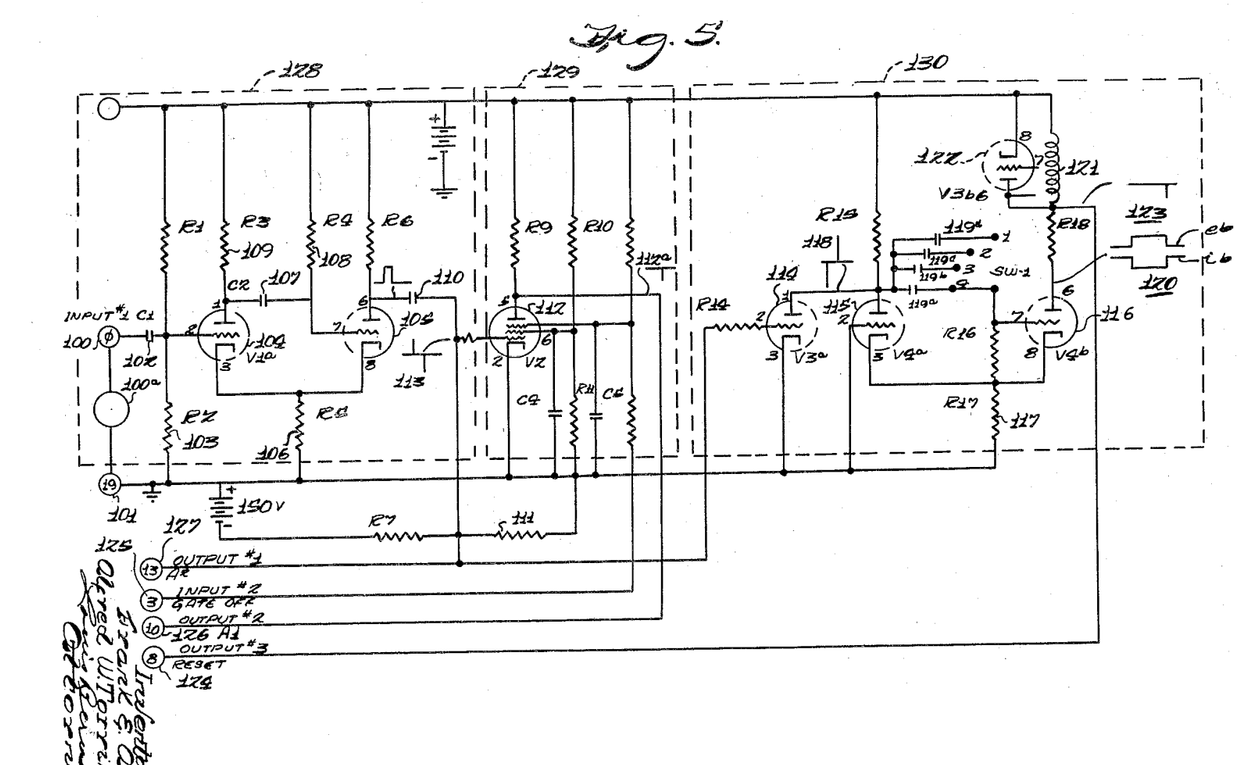
Figure 5 is a schematic circuit diagram of the mechanism for generating signals from the control pulses for application to the time phase comparator.

Considering now the reference pulse shaping system, the pulses appear at the source 100a, Figure 5. This source may, for example, produce pulses with a repetition rate of 30 per second, corresponding to a speed of shaft 20a of 1800 r.p.m. These pulses are preferably sharp and square, or are made so by suitable preliminary pulse shaping circuits (not shown).

The pulses from source 100a are differentiated by capacitor 102 and resistance 103 and the resultant differentiated voltage is applied to the monostable multivibrator defined by vacuum tubes 104 and 105. This multivibrator has only one stable condition, namely that with the tube 105 conducting and tube 104 cut off by the positive cathode bias derived from the common cathode resistance 106. When the positive differentiated pulse is applied to tube 104, the control grid is driven to a voltage causing conduction, thereby causing the control grid of tube 105 to cut that tube off by reason of the negative swing of that grid due to capacitor 107. Thereafter, the charge on capacitor 107 changes by reason of discharge current flow through resistance 108 until the control grid of tube 105 no longer cuts off cathode-anode space current in tube 105 and the latter again conducts to restore the multivibrator to its quiescent state (tube 105 conducting, tube 104 cut off). The effect of this action is to develop at the anode of tube 105 a rather square positive pulse of predetermined duration fixed by the values of capacitor 107 and the resistance 108. The duration of this pulse may, for example, be 15 to 20 mircroseconds.

The positive pulse appearing at the anode of tube 105 is differentiated by capacitor 110 and resistance 111 to produce a sharp positive pulse followed by a sharp negative pulse, the latter being delayed by the 15 to 20 microsecond duration of the square pulse at the anode of tube 105, as shown at 113, Figures 4 and 5.

The above described portion of the circuit of Figure 5 is the pulse shaper indicated at 128, Figures 4 and 5.

The differentiated positive pulse 113 is applied to the control grid of the gate tube 112. The positive portion of this differentiated pulse is inverted by the action of tube 112 to become a negative pulse at the anode of tube 112. This becomes the output signal 112a, Figures 4 and 5, which is applied to the comparator circuit of Figure 7 as hereinafter described in detail.

The tube 112 has its suppressor grid connected to terminal 125, Figures 4 and 5. This terminal is supplied with gating voltage by the multivibrator circuits of Figure 7 to block the tube 112 and thus prevent generation of the signal 112a when the controlled pulse precedes the control pulse as shown in Figure 3b.

The gating circuit 129 of Figure 5 is shown in block form at 129, Figure 4.

The differentiated pulse 113 is also fed to the trigger amplifier tube 114. This tube acts as a phase inverter and amplifier to produce a pair of spaced pulses at its anode having opposite sense to those of pulse 113, as shown in Figure 5. This inverted wave is applied to the monostable multivibrator formed by tubes 115 and 116. This multivibrator in its quiescent condition has the tube 116 conducting and the tube 115 non-conducting, this condition being held by the fact that the positive bias on the cathode of tube 115 due to voltage drop in the common cathode resistance 117 maintains tube 115 cut off. The negative pulse of the wave 118 developed by the trigger 114 is applied through the selected capacitor 119a, 119b, 119c, or 119d, to the control grid of tube 116, thus driving that tube to cut-off and causing tube 115 to conduct. The multivibrator maintains this condition until the charge changes on the selected capacitor 119a, 119b, 119c or 119d, to the point where the grid of tube 116 exceeds cut-off and conduction in that tube is restored.

The period of dwell of the multivibrator defined by tubes 115 and 116 is determined by the value of the selected capacitor 119a to 119d. The period chosen is about one-half the period of the time pulses appearing at terminal 100—101 due to source 100a.

The current wave at the anode of tube 116 is shown to an exaggerated scale at 120, Figure 5. When this current wave passes through the inductance 121, high frequency oscillations are shock induced at the leading and trailing edges of the pulse. These are rectified by the diode connected triode 122 to produce the reset wave indicated at 123, which is applied to the network of Figure 7 at terminal 302 as hereinafter described.

The negative swing of the wave 123 at the inception of the pulse from source 100a is of no consequence as it is of too small a magnitude to affect the network at terminal 302. The reset mechanism including tubes 114, 115 and 116 is indicated at 130 in the block diagram of Figure 4.

Figure 6:
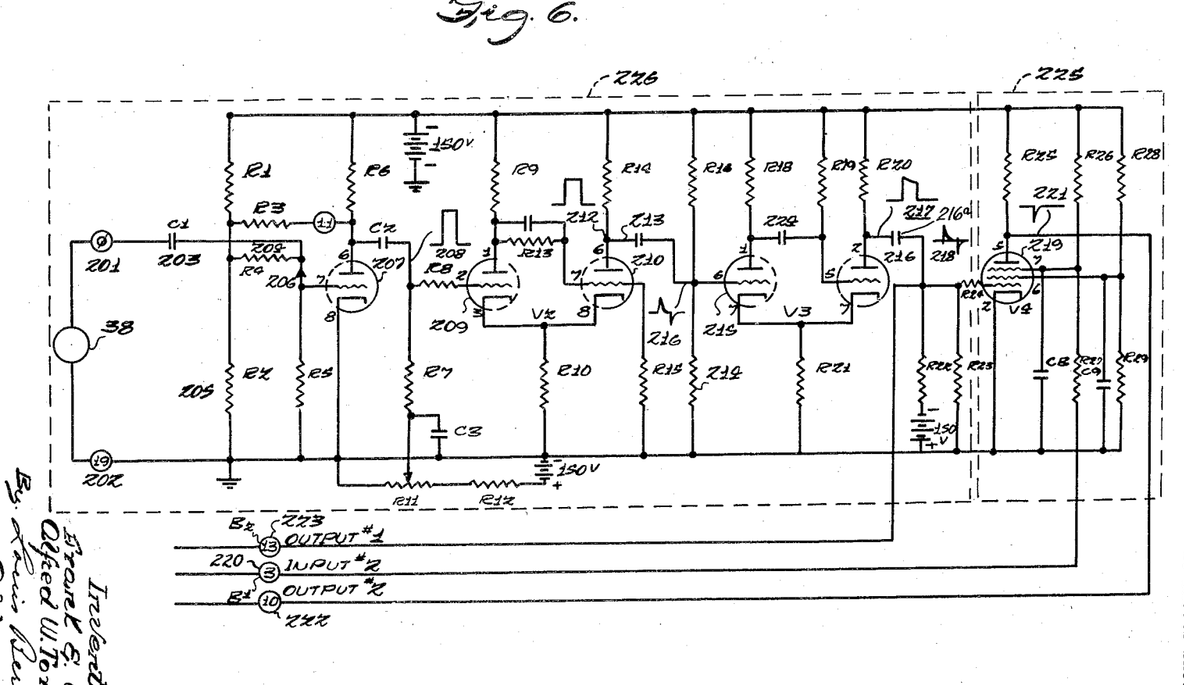
Figure 6 is a schematic circuit diagram of the mechanism for generating signals from the controlled pulses for application to the time phase comparator.
Figure 7:
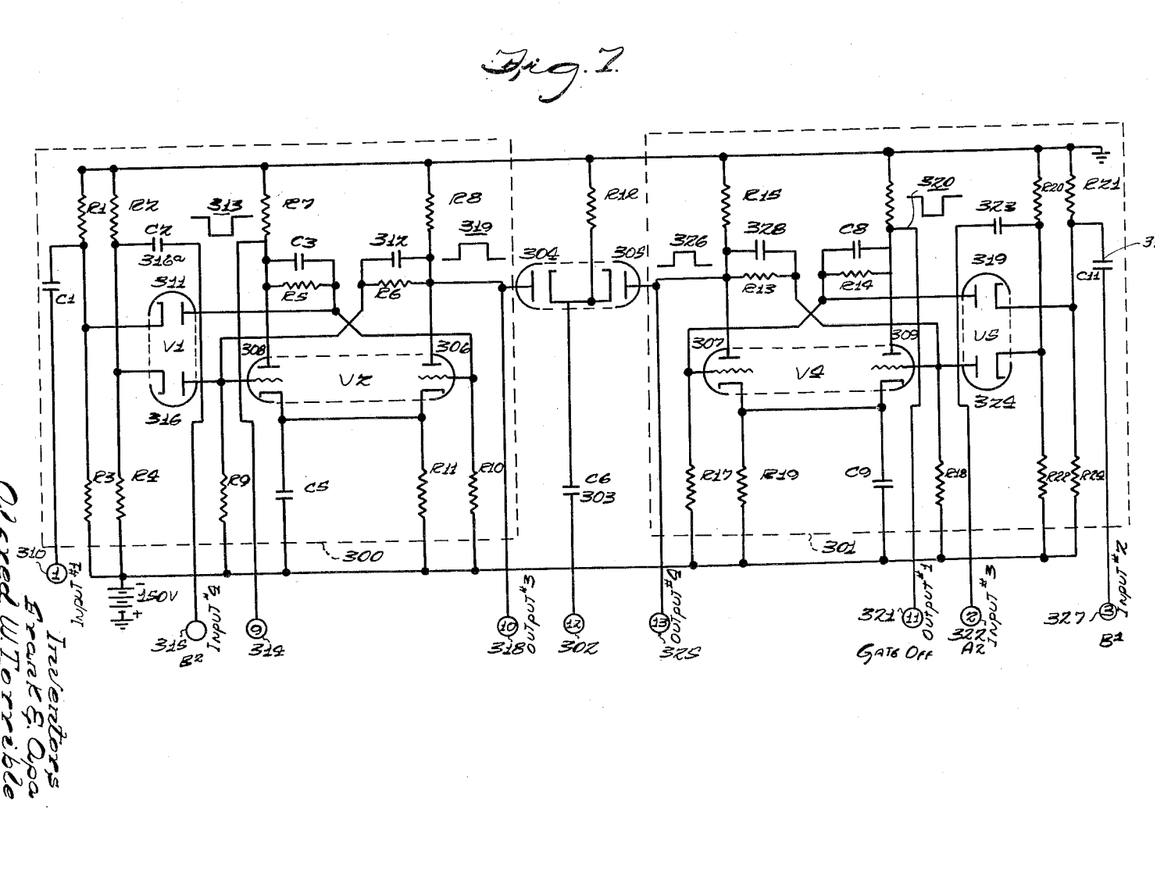
Figure 7 is a schematic circuit diagram of the time phase comparator itself.

The circuits of Figure 6 serve to shape the controlled pulse from pickup 38 and provide other control signals. The signal from the magnetic pickup 38, Figure 1, is first amplified by a suitable pre-amplifier (not shown) and then applied across terminals 201—202, Figure 6. The signal thus applied across capacitor 203 and resistances 204 and 205, is clipped by the crystal diode 206 and then amplified and inverted by the action of tube 207 to form a generally rectangular positive pulse 208 which is applied to the control electrode of tube 209.

Tubes 209 and 210 act as a Schmitt trigger to sharpen the pulse 208 and produce a sharpened pulse of like sense at the anode of tube 210. This wave is differentiated by the capacitor 213 and the resistance 214 to form the differentiated wave 216 which is applied to the monostable multivibrator formed by the tubes 215 and 216.

The multivibrator formed by the tubes 215 and 216 is like that above described with reference to tubes 104 and 105, Figure 5. It produces at the anode of tube 216 a generally square wave 217 having duration determined by the rate of discharge of capacitor 224. Ths wave is differentiated by the capacitor 216a and the resistance R23 to form the positive and negative spaced pulses 218 which become the output signal at terminal 223 which is applied to the network of Figure 7 as hereinafter described.

The above described portion of the mechanism of Figure 6 is the shaper indicated in block form of Figure 4 and 6 at 226.

The differentiated wave 218 is further applied to the control grid of the gate tube 219. If—at the time of the positive portion of wave 218—the tube 219 is gated to a conducting condition by a lack of control voltage applied to the terminal 220 from the multivibrators of Figure 7 (to indicate that the condition of Figure 3b is fulfilled and the controlled voltage pulses lag the control voltage pulses), the positive portion of the wave 218 becomes a negative pulse at the anode of tube 219 as indicated at 221. The wave 221 becomes the signal which is applied to the circuits of Figure 7 as hereinafter described.

The gate circuit involving tube 219 is indicated in block form at 225, Figures 4 and 6.

The time phase comparing function is performed by the apparatus shown in Figure 7. In brief, this unit includes two bistable multivibrators 300 and 301 (Figures 4 and 7) which are conditioned to the zero output state by the reset pulse derived from terminal 124, Figure 5. This action is achieved by the application of the reset pulse to the terminal 302, Figure 7, and hence through the capacitor 303 to the cathodes of diodes 304 and 305. Since the reset pulse is a negative pulse, it is applied through the diodes to the anodes of tubes 306 and 307 and through capacitors 312 and 328 to the control electrodes of tubes 308 and 309, respectively. This has the effect of starting the operating cycle which results in tubes 308 and 309 being cut off and tubes 306 and 307 conducting.

Since the reset pulse 123, Figures 4 and 5, is delayed by about half the period of the control wave applied to terminals 100—101, the multivibrators 300 and 301 are certain to be in the zero output state when each pulse of the control wave appears at terminals 100—101. The time positions of the reset pulse for the respective phase relations of the control and controlled pulses are shown in Figures 3a and 3b.

The operation of the mechanism of Figure 7 can best be explained by assuming first that the shaft 20a is lagging its desired position so that the pulse in pickup 38— and hence the positive pulse of the signal 218, Figures 4 and 6—lags the control pulse applied to terminals 100—101, Figure 5—and hence the negative pulse of the signal 112a, Figures 4 and 5. This is the condition shown in Figure 3a. This means that the multivibrator 300 is first driven to a change of state by wave 112a. The state of multivibrator 301 is not changed, however, because of the action of gate 225, Figure 4, as described hereafter.

The change of state of the multivibrator 300 is brought about by the application of the negative pulse of the signal 112a, Figures 4 and 5, to the terminal 310, Figure 7. This negative pulse swings the cathode of diode 311 in the negative direction, thereby driving the control electrode of tube 306 to anode current cut-off. When the anode current cuts off in tube 306, the anode swings positive and—through capacitor 312—causes conduction in tube 308. The resultant current flow in tube 308 swings the anode of that tube in the negative direction and thereby creates the negative wave 313 which appears at terminal 314.

The negative wave 313 is applied to terminal 220, Figure 6, to block gate tube 219 and arrest any signal 221, Figures 4 and 6, during the time tube 308 is conducting. This action results from the negative voltage applied to the suppressor grid of tube 219 from the terminal 220.

The multivibrattor 300 is returned to its initial state by the wave 218 (Figures 4 and 6) which has a positive pulse coincident with the induced voltage pulse in the magnetic pickup 38, Figure 1, and a negative pulse delayed by the period of the multivibrator formed by tubes 215 and 216. As shown in Figure 7, the wave 218 is applied to terminal 315 and—through capacitor 316a—to the cathode of diode 316. The diode 316 blocks the positive pulse of wave 218 but passes the negative pulse to initiate the action that drives tubes 308 to cut-off and thereby restore the multivibrator to its non-signal state with tube 306 conducting.

Figure 8:
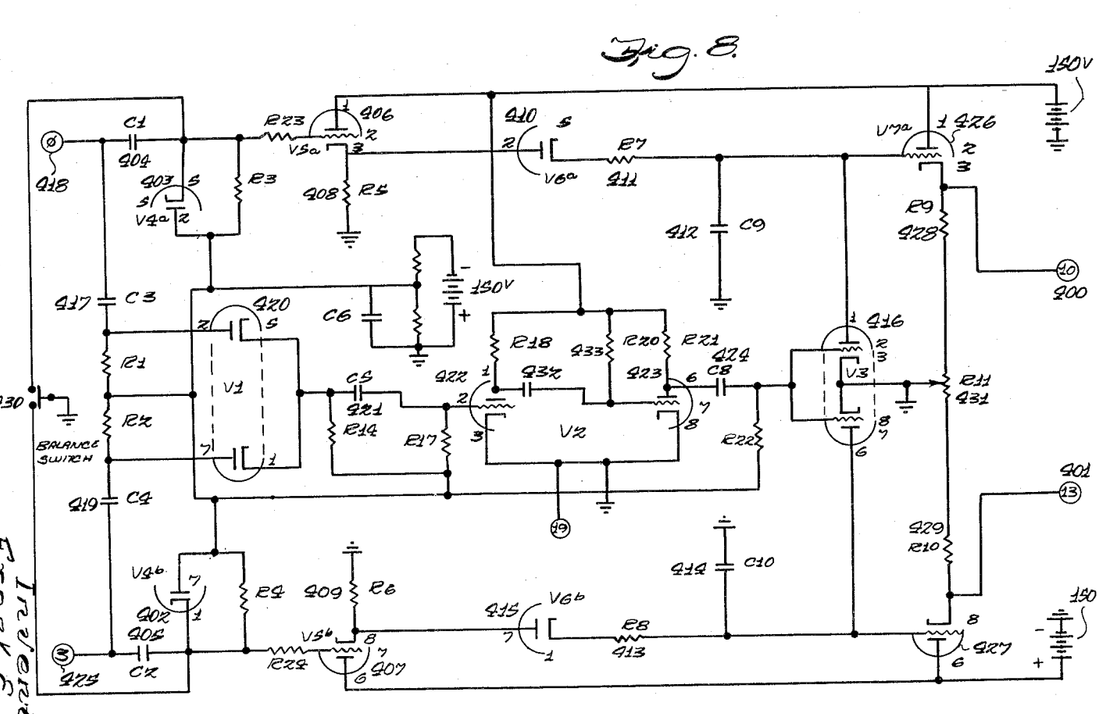
Figure 8 is a schematic circuit diagram of the mechanism by which the pulses from the time phase comparator are converted to pulses modulated in amplitude by the shaft phase error.

The wave appearing at the anode of tube 306—and hence the wave applied through terminals 318 and 418 (Figures 4 and 8) to the width to amplitude converter of Figure 8 as hereafter described—is accordingly a positive pulse 319 having duration determined by the amount of delay of the voltage induced in magnetic pickup 38 over the reference pulse applied to terminals 100—101, Figure 5. This voltage is shown as $V_{318}$, Figure 3a.

If we assume that the shaft 20a leads its proper phase position—so that the voltage is induced in pickup 38 before the reference pulse appears at terminals 100—101, Figure 5—then the wave 221 is produced by the circuits shown in Figure 6. This is due to the fact that gate tube 219 has not previously been blocked through terminals 314, Figure 7, and terminal 220, Figure 6. It will be remembered in this connection that the reset signal applied to terminal 302, Figure 7, places multivibrators 300 and 301 in the no-signal condition before this action occurs. The wave 222 is applied through the terminal 327, Figure 7, and the diode 319 to the control electrode of tube 307. This circuit may be traced through capacitor 329. This action starts multivibrator action to drive multivibrator 301 to the condition wherein tube 309 conducts and tube 307 does not. This produces a negative voltage wave 320 at the anode of tube 309 which is applied to terminal 321 and thence to terminal 125, Figure 5, to drive tube 112 to cut off and thereby prevent passage of signal through gate 129. The wave 112a, Figure 5, is accordingly arrested and hence there is no voltage 112a at terminal 126, Figure 5, and thus no voltage applied to terminal 310, Figure 7. The multivibrator 300 accordingly is not influenced by the wave 112a so long as tube 309 is conducting.

The multivibrator 301 is triggered to its normal or no-signal state by the voltage 113 which is derived from the circuit of Figure 5. The positive portion of this voltage wave is coincident with the control pulse applied to terminals 100—101, as discussed above, but does not trigger multivibrator 300. However, the negative portion is applied through diode 324 to the control grid of the tube 309. This drives the grid of tube 324 in the negative direction—and the multivibrator 301 thereby swings to its original or no-signal state—at the time of the negative pulse of the wave 113. The multivibrator is accordingly returned to the no-signal state after delay fixed by the time delay between the pulse in the pickup 38 and the control pulse, plus the dwell period of the multivibrator formed by the tubes 104 and 105. Since the output terminal 325 is connected to the anode of tube 307, the effect of the above is to produce at that terminal the signal 326, which is a positive pulse of duration determined by the extent the shaft 20a leads the desired position.

The action last above described is shown in Figure 3b.

Thus it will be observed that a voltage pulse appears at terminal 318, Figure 7, when the shaft is lagging and at 325, Figure 7, when the shaft is leading. Moreover, in each instance the duration of the pulse is determined by the extent of the lag or lead, plus the delay of the multivibrator formed by tubes 215 and 216, in the first instance, and the multivibrator formed by tubes 104 and 105, in the second instance.

*Width to amplitude converter*

(30, Figure 1)

The circuit of the pulse width to signal amplitude converter is shown in Figure 8. Terminal 418 of this converter is connected to the terminal 318, Figure 7, of the pulse phase comparator and terminal 425 of this converter is connected to the terminal 325 of the pulse phase comparator. In brief, the width to amplitude converter includes two interconnected circuits which produce an output voltage across terminals 400 and 401 of amplitude determined by the duration of the pulses applied to terminal 418 or 425 and sense determined by whether the pulses appear at the former or the latter terminal.

In the apparatus of Figure 8 the diodes 402 and 403 act in conjunction with capacitors 405 and 404, respectively, to form clamping circuits. It will be noted that the diodes are connected in the same orientation so that the voltage at the control grid of tube 406 consists of the wave (if any) applied to terminal 418, but extending in the positive direction only, and the voltage at the grid of tube 407 consists of the wave (if any) applied to terminal 425 and extending in the positive direction only.

Tubes 406 and 407 are connected as cathode followers with their output voltages taken across resistances 408 and 409, respectively. The output voltage or wave across resistance 408 is applied through the diode 410 where it is integrated by the integrating network defined by resistance 411 and capacitor 412. Similarly, the voltage appearing across resistance 409 is applied to the integrating network defined by resistance 413 and the capacitor 414 through the diode 415.

The purpose of the diodes 410 and 415 is to permit integrating action through the charging of capacitors 412 and 414 while at the same time assuring that these capacitors have no discharge current path other than that due to their own inherent leakage.

However, the capacitors 412 and 414 are initially discharged by the twin triode electron tube 416 each time a pulse appears at terminal 418 or terminal 425. This circuit can be traced from terminals 418 and 425 through capacitors 417 and 419, respectively, to the anodes of twin diode 420 and thence through the cathodes of that tube and capacitor 421 to the control grid of tube 422. The latter acts as a phase inverter and amplifier to feed a second amplifier including tube 423 which in turn applies the signal through capacitor 424 to the control electrodes of tube 416. The net effect is to apply any positive pulse at either terminal 418 or 425 in amplified form to the control electrodes of tube 416 and thereby rendering both halves of tube 416 conducting and discharging any charge on either of capacitors 412 and 414.

The capacitors 421, 432 and 424 serve as differentiating devices so that the square wave pulse appearing at terminal 418 or 425, as the case may be, becomes a sharp positive pulse at the time of the leading edge of the square wave pulse. Hence the tube 416 is conducting only during the initial instant of each pulse applied to terminal 418 or 425 and during the remainder of each square wave pulse the capacitors 412 and 414 are free to charge in integrating action. The shortest time constant in the differentiating circuit is that of capacitor 432 and is of the order of 30 microseconds. Because of this fact— and the action of the other circuit components—the tube 416 conducts for 25 to 30 microseconds at the beginning of each pulse.

It will be recalled that the pulses produced at terminals 318 and 325 exceed the actual phase displacement of the shaft 20a by 25 to 30 microseconds. This is due to the action of the multivibrator formed by the tubes 104 and 105, Figure 5, and the multivibrator formed by the tubes 215 and 216, Figure 6. In each instance the pulse which ultimately restores the no-signal condition of multivibrator 300 or multivibrator 301 is delayed by a time equivalent to the time that the tube 416 disables the capacitors 412 and 414. Consequently, the actual charging period for each capacitor is proportional to the magnitude of the phase displacement of the shaft 20a and the voltage across terminals 400 and 401 is likewise proportional to that displacement.

The balance switch 430 is provided to ground simultaneously the cathodes of tubes 402 and 403 and thus create a no-signal—balanced—condition. With this switch closed, the potentiometer 431 can be adjusted to balance the voltage drops in resistances 428 and 429 and also balance the characteristics of tubes 426 and 427 and thus assure zero voltage across terminals 400 and 401.

It should be further noted that since the pulses applied to the terminals 418 and 425 are short in relation to their period—and the charge on condenser 412 or 414 remains until the next pulse—the voltage across terminals 400 and 401 is held for relatively long periods spaced by the relatively short periods when pulse is applied to terminals 418 or 425.

The balanced modulator (28, Figure 1)

Figure 9:
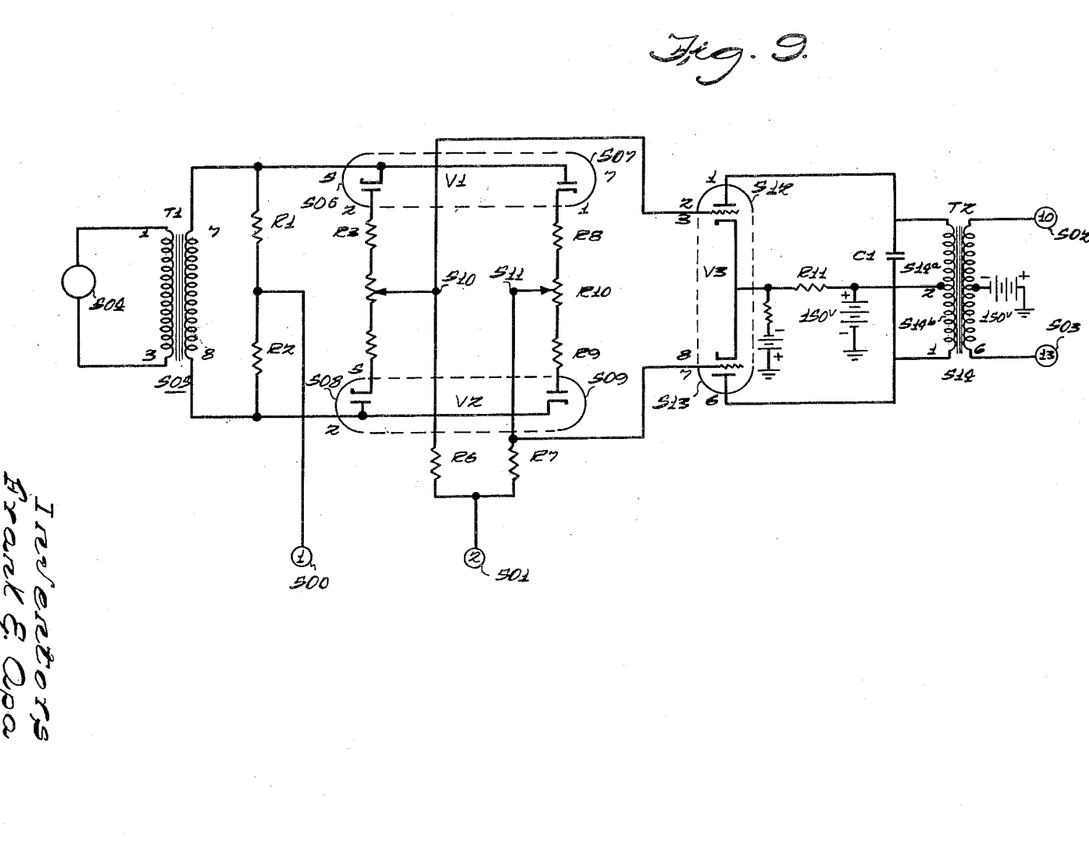
Figure 9 is a circuit diagram of the balanced modulator by which the pulses created by the apparatus of Figure 8 are converted to alternating voltages having magnitude modulated in accord with the shaft phase error and sense determined by the sense of the error.

The balanced modulator circuit is shown in Figure 9. The terminals 500 and 501 of the modulator are connected to terminals 400 and 401 of the pulse width to amplitude converter of Figure 8. As hereafter described, the effect of the balanced modulator is to produce an alternating voltage at terminals 502 and 503 which is of sense and magnitude determined by the voltage applied to terminals 500 and 501. This voltage is in quadrature relation to a reference voltage and the two are applied to the servo motor 717, Figure 11.

The quadrature alternating voltage is derived from the source indicated at 504. This source may, for example, consist of the main 60 cycle alternating voltage source 700, Figure 11, which feeds the servo motor 717, Figure 11, taken through a phase shifting capacitor which imparts 90 degrees phase shift.

The alternating voltage is fed through the transformer 505 to the balanced modulator circuit defined by the diodes 506, 507, 508 and 509. It will be noted that this is a balanced bridge in which the voltage appearing across output terminals 510 and 511 is balanced when only alternating voltage is applied. As this balanced voltage is applied to the control grids of electron tubes 512 and 513, the effect is to produce quadrature alternating voltage component across terminals 502 and 503.

The application of unidirectional voltage across terminals 500 and 501 upsets the balance of the modulator formed by the diodes 506, 507, 508 and 509. This action is due to the nonlinear conduction characteristics of the diodes 506, 507, 508 and 509. For example, if terminal 500 is made positive in relation to terminal 501, the diodes 507 and 508 have in effect a smaller resistance and the diodes 506 and 509 a greater resistance, thus causing terminal 510 to swing towards the potential of the anode of diode 508 and terminal 511 to swing towards the potential of the anode of tube 507. A push-pull alternating voltage is thus applied to the push-pull amplifier tubes 512 and 513 and hence to transformer 514.

On the other hand, if the terminal 501 is made positive in relation to terminal 500, diodes 506 and 509 have in effect a lower resistance and diodes 507 and 508 have in effect greater resistance. The result is to swing terminal 510 towards the potential of the anode of diode 506 and terminal 511 towards the potential of the anode of diode 509. Push-pull alternating voltage is accordingly applied to the push-pull amplifier tubes 512, but at 180 degrees phase shift—or in opposite sense— to that applied when terminal 500 is made positive in relation to terminal 501.

It will be noted that the voltage applied to the push-pull amplifier tubes 512 and 513—and hence applied to transformer 514 and appearing at terminals 502 and 503—is of magnitude determined by the magnitude of the D.-C. voltage at terminals 500 and 501. Moreover, the A.-C. voltage at terminals 502 and 503 is the same frequency as the voltage from quadrature source 504 and has either the same phase position or the opposite (180 degrees out of phase) position, depending upon the direction of the D.-C. voltage across terminals 500 and 501.

The servo amplifier (26, Figure 1)

Figure 10:
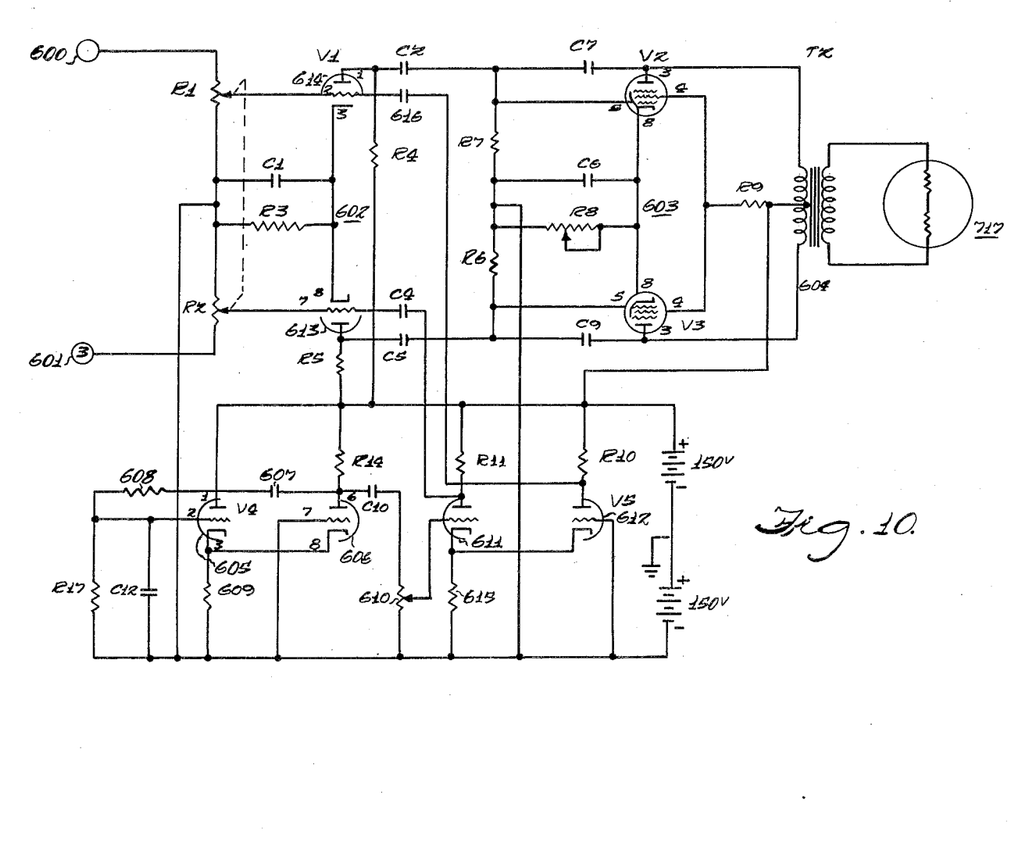
Figure 10 is a schematic circuit diagram of the servo motor energizing circuit, including the dither oscillator.

The servo amplifier circuit is shown in Figure 10. Terminals 600 and 601 of this amplifier are connected to terminals 502 and 503 of the balanced modulator of Figure 9 so that the amplifier of Figure 10 is supplied with 60 cycle quadrature voltage of magnitude and sense determined by the magnitude and sense of the phase displacement of the shaft 20a, Figure 1, as above described.

The servo amplifier utilizes push-pull stages 602 and 603 which energize the balanced primary winding of transformer 604. The secondary winding of this transformer is connected to the servo motor 717, Figures 10 and 11, as hereafter described.

The servo amplifier further includes a Wien bridge type "dither" oscillator defined by electron tubes 605 and 606. It will be noted that tube 606 is connected as an amplifier with respect to tube 605 and a positive feedback path is provided from the anode of tube 606 to the control electrode of tube 605 through the capacitor 607 and resistance 608. Negative feedback voltage is provided by the common cathode resistance 609. The effect of this circuit is to provide oscillations of nearly sine wave form across the output potentiometer 610.

The oscillations across the potentiometer 610 are applied through the adjustable terminal thereof to the control electrode of vacuum tube 611 which acts as an amplifier to supply the oscillations, in inverted form, to the control electrode of vacuum tube 613. The amplifier tube 611 also is connected as a cathode follower with the cathode resistance 615 to supply electron tube 612, which is connected as a grounded grid amplifier with its anode connected through capacitor 616 to the control electrode of amplifier tube 614. The effect of tube 612 is to apply the oscillations from potentiometer 610 to the control electrode of tube 614 without phase inversion. Hence the oscillations across potentiometer 610 are applied in push-pull relation to the amplifier 602.

Figure 11:
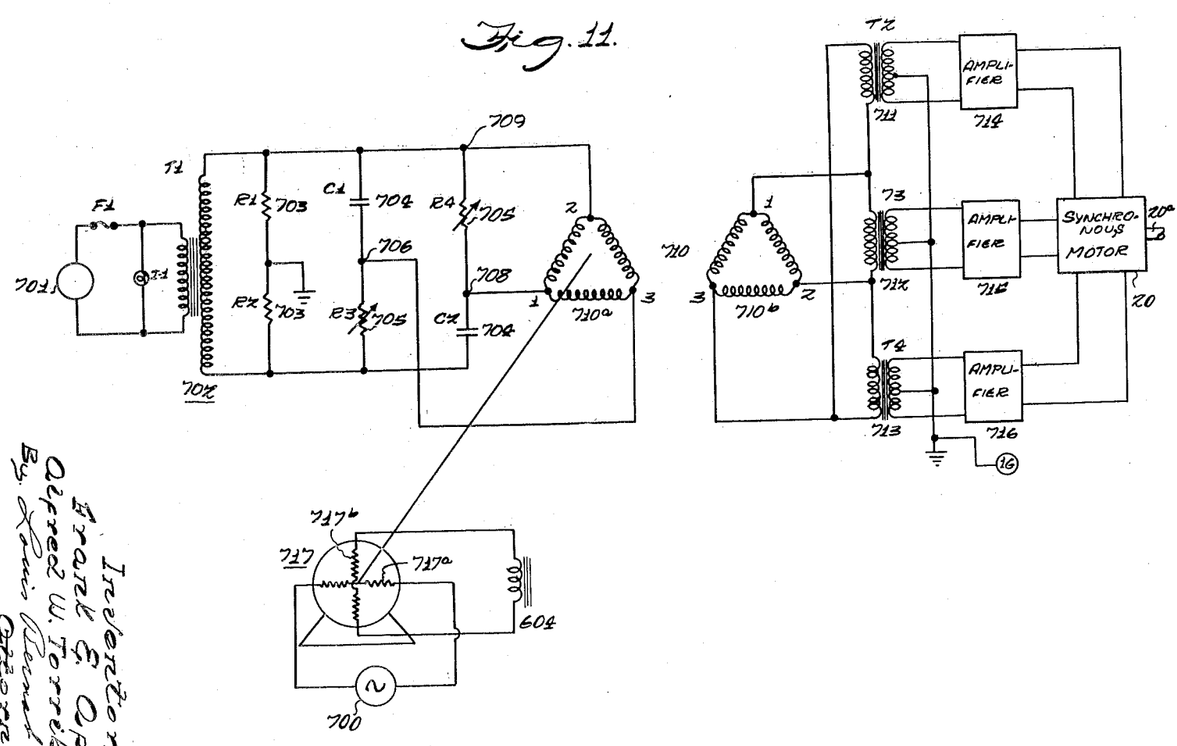
Figure 11 is a schematic circuit diagram of the energizing mechanism for the synchronous motor.

Since the oscillations from the Wien bridge oscillator are applied in push-pull relation to the push-pull amplifier 602 they appear in amplified form in the output circuit of push-pull amplifier 603, namely in the secondary winding of the transformer 604. These oscillations are of different frequency than those of the main or control frequency of source 504, Figure 9, and 700, Figure 11. Thus, for example, if the main or control frequency of the quadrature source 504, Figure 9, and the in-phase or reference voltage source 700, Figure 11, is 60 cycles, the Wien bridge oscillator may be constructed with capacitor 607 and resistance 608 of values to give about 40 cycles per second. The action of the Wien bridge oscillations is described hereafter.

It will be noted that the voltage across the secondary winding of transformer 604 has two components. The first component is the quadrature voltage of frequency determined by source 504, Figure 9, magnitude determined by the extent of the phase error of shaft 20a, Figure 1, and sense determined by the direction of the phase error of shaft 20a. The second voltage is of frequency determined by the oscillations across potentiometer 610 and is of magnitude generally independent of the extent of the phase error of shaft 20a.

*The drive motor control mechanism*

(24, Figure 1)

The drive motor control mechanism is shown diagrammatically in Figure 11. In brief, this mechanism supplies balanced three phase motor driving voltage to the synchronous drive motor 20, Figure 1, having frequency determined by the A.-C. source 701 (i.e. 60 cycles) and of phase relation to that source determined by the direction and extent of the phase error of shaft 20a.

The A.-C. source 701 feeds the primary winding of transformer 702, the secondary winding of which has its center point grounded through resistances 703, capacitors 704 and variable resistances 705 from a phase shift circuit by which voltage 120 degrees out of phase with the voltage of source 701 is produced between terminals 706 and 708. This voltage is balanced with the voltage between each of terminals 706 and 708 and the terminal 709 to produce a balanced set of three phase voltages which are applied to the rotor 710a of the differential synchro generator 710.

The synchro generator 710 is of conventional construction with a wound rotor 710a having three like windings physically spaced 120 degrees apart to produce a rotating magnetic field when energized with balanced three phase voltages. The stator of the synchro generator has a like set of windings in which a balanced set of three phase voltages are induced by the rotating magnetic field generated by the rotor 710a. Since the physical position of the rotor 710a controls the physical position of the rotating magnetic field at any instant, the phase positions of the induced voltages in the windings of stator 710b (with respect to a reference, such as source 701) are controlled by the physical position of the rotor 710a.

The stator voltages of the synchro transformer 710 are applied through the transformers 711, 712 and 713 to the amplifiers 714, 715, and 716 and thence to the three phase windings of the polyphase synchronous motor 20 having shaft 20a to be controlled.

The position of the rotor 710a is controlled by the rotor of the servo motor 717, Figure 11 (also shown in Figure 10). This motor is a two phase induction motor having one phase winding, 717a continuously supplied with fixed A.-C. voltage by in-phase voltage source 700 and the other phase winding 717b, supplied with voltage in quadrature with respect to source 700. The latter voltage is taken from the secondary winding of transformer 604 which—as described above with reference to Figure 10—has an induced voltage of magnitude determined by the extent shaft 20a departs from the desired phase and of one quadrature phase position or the other in accordance with the direction of the departure.

The rotor of the two phase induction motor 717 is coupled by a suitable gear train (not shown) to the rotor 710a of the synchro transformer 710. Thus the rotor 710a is turned in direction determined by the direction shaft 20a departs from desired phase position and with torque determined by the extent of the departure of shaft 20a from desired phase position.

The above described system has been found both sensitive and rapid in restoring shaft 20a to desired phase position. This is believed to be due to the fact that a phase error of shaft 20a is almost instantaneously reflected in a change in the voltage at the secondary winding of transformer 604 and—since the servo motor 717 has a small inertia constant—in a change in the phase position of the three phase voltages applied to synchronous motor 20. The latter motor very quickly responds to the changed phase of the polyphase driving voltages since the motor torque quickly increases or decreases when the rotor departs from the synchronous position where the load torque is balanced.

The speed of response and sensitivity of the system is further increased by the voltage generated by the Wien bridge oscillator composed of tubes 605 and 606, Figure 10. This voltage is at all times applied to the quadrature winding 717b of the servo motor 717. Since it is slightly different in frequency than the frequency of the source 700, Figure 11, the effect is to provide a voltage of apparently gradually increasing and decreasing phase lag and lead in relation to the voltage of the source 700. This drives the rotor of the servo 717 first in one direction and then the other in a small amplitude "dither" oscillation. This oscillation assures constant motion of the rotor of servo motor 717 (and the rotor 710a of the synchro unit 710) so that the parts are under moving and not static friction. Since the latter friction is much greater than the former, the frictional opposition to control response—and the tendency for a dead band in the system—is reduced.

The connections of the various parts of the system above described are arranged so that the variation in phase of the balanced polyphase voltages applied to motor 20 is of such direction as to drive the motor in direction opposite to the initial phase error of shaft 20a, thus forming a complete closed cycle control system.

*Alternate comparator construction*

Figure 12:
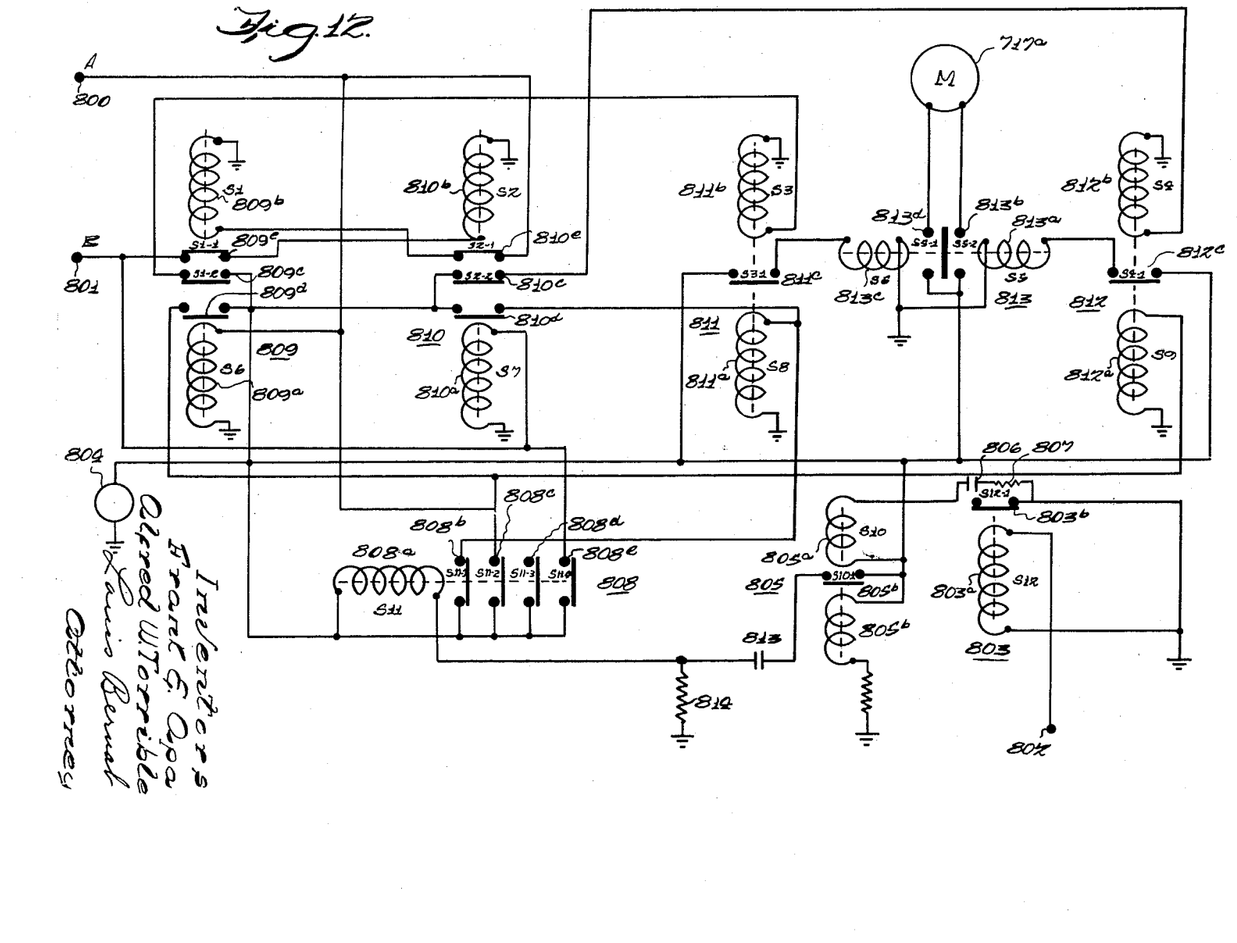
Figure 12 is a circuit diagram of an alternative form of the invention using electromagnetic relays.

Figure 12 shows an alternate form of the comparator circuit in which the operation is achieved by relays rather than thermionic tubes. In this circuit the reference time pulses from source 100a, Figure 5, are applied to terminal 800; the time pulses to be compared from pickup 38, Figure 1, are applied to terminal 801, and resetting pulses (which may be obtained, for example, from the reference source 100a, Figure 5, by a time delay circuit such as that of tube 116, Figure 5, as above described) are applied to terminal 802. The relays are shown in the conditions assumed after a resetting pulse is applied.

Resetting operation of the circuit of Figure 12 is derived from application of the resetting pulse from terminal 802 to the winding 803a of the relay 803. This opens the normally closed contacts 803b to apply voltage from source 804 through winding 805a of differential relay 805 to the differentiating circuit formed by capacitor 806 and resistance 807. The resultant momentary decaying current flow through winding 805a closes the contacts 805b of relay 805 to energize the winding 808a of relay 808 from source 804. This closes the normally open contacts 808b, 808c, 808d and 808e of the relay 808 to energize windings 809a, 810a, 811a and 812a of the relays 809, 810, 811 and 812 in unison. This pulls the armature of each of relays 809—812 to the positions shown in Figure 12. After actuation of relay 808, the current flow in winding 805a of the relay 805 falls to a value wherein the current in continuously energized winding 805b overcomes the effect of winding 805a and the relay 805 is returned to the position shown in Figure 12. Also, the current flow in winding 808a is given a high initial value decaying characteristic by the action of the capacitor 813 and resistance 814 so that by the time contacts 805b open the current in winding 808a is of small magnitude.

After the above resetting operation, application of a controlled time pulse to terminal 801 energizes winding 810b of relay 810 to close contacts 810c and 810d and open contacts 810e. The latter contacts open the circuit to winding 809b of relay 809 and thus disable that relay. The contacts 810c, when closed, establish the energizing circuit to the winding 812b of the relay 812, thereby closing the normally open contacts 812c of the relay 812. Closure of the latter contacts energizes the winding 813a of the relay 813 to close contacts 813b and drive servo motor 717a in one direction as described in detail hereafter.

Thus, if the pulse to be controlled—and applied to terminal 801—is the first to succeed the reset operation, the motor 717a is energized for rotation in one direction.

However, if—after reset—the controlling pulse appears at the terminal 800 before the controlled pulse appears at terminal 801—relay winding 809b is energized through the closed contacts 810e of relay 810. This closes contacts 809c and 809d and opens contacts 809e. The latter contacts disable relay 810, whereas contacts 809c energize winding 811b of relay 811 to close contacts 811c to energize winding 813c of the relay 813 and close contacts 813d to drive servo motor 717a in the opposite direction.

The purpose of contact 809d of the relay 809 is to energize relay winding 812a whenever the winding 809b of relay 809 is energized. This assures that relay contacts 812c are in the open condition whenever winding 809b is energized by a control pulse at terminal 800. Since under this condition winding 813c of the relay 813 is energized there is assurance that the action of that winding is not defeated by current flow in winding 813a through contacts 812c. The contacts 810d have a similar purpose as they assure that winding 811a is energized whenever winding 810b is energized by a control pulse appearing at terminal 801—this condition being that when winding 813a is energized to cause rotations of servo motor 717a in the direction to cause the main drive motor 20 to lag in phase position.

The relays 809, 810, 811, 812 and 805 are differential relays wherein the armatures are pulled in opposed directions by current flow in the respective windings. No return springs or other mechanisms are provided to bias the armatures in either direction so that the armatures remain in whatever position they are after the last actuation. Relay 813 is likewise a differential relay but it is provided with a biasing means to bring it to an intermediate non-contact making position when windings 813a and 813c are deenergized.

In the apparatus of Figure 12 the signal applied to terminal 800 may be the reference pulse without any modification and the signal applied to the terminal 801 may be the voltage induced in magnetic pickup 38 without modification.

The motor 717a, Figure 12, is connected in the controller of Figure 11 in place of the motor 717 of that figure. If source 804 is an A.-C. source, the motor 717a is a two phase servo motor like motor 717, the phase not shown being energized from source 804 with a quadrature voltage. In addition, the motor 717a, in this case, is provided with two windings on the phase connected to contacts 813d and 813b so that torque is developed in one direction or the other depending on the condition of contacts 813a and 813b.

While we have shown and described specific embodiments of the present invention it will, of course, be apparent that various modifications and alternative constructions may be made without departing from the principles thereof. We, therefore, intend by the appended claims to cover all modifications and alternative constructions falling within their true spirit and scope.

What we claim as new and desire to secure by Letters Patent of the United States is:

1. A system to maintain a rotating shaft at a predetermined phase position in relation to periodic reference pulses, comprising in combination: a source of periodic reference pulses; a pickup device adapted to generate control pulses developed by the rotating shaft thereby indicating a fixed phase relationship; means to produce a control voltage of value determined by the time interval signal between the reference pulses and the control pulses whereby sense being determined by the order relationship of said pulses; a synchronous drive motor for the shaft; means to supply polyphase A.-C. of adjustable phase to the motor; control mechanism including a two phase servo motor to vary the phase of said A.-C.; one phase of a servo motor being energized by alternating voltage of constant magnitude; the other phase energized by a quadrature alternating voltage; said quadrature alternating voltage being determined in accord with the value of the control voltage and in direction to advance or retract the drive motor in order to restore the predetermined shaft phase position; an oscillator adapted to produce oscillations of frequency different from the frequency of said last-mentioned sources; and means to apply oscillations from an oscillator from said other phase of the servo motor to impart small amplitude dither oscillations thereto independent of the quadrature voltage and thereby prevent static friction to the servo motor.

2. A system to maintain a rotating shaft at a predetermined phase position in relation to periodic timing pulses, comprising in combination: a synchronous drive motor for the shaft; means to supply polyphase A.-C. of adjustable phase to the motor; means to produce a pulse each time the shaft passes a predetermined phase position; means to compare the last pulses with the periodic timing pulses and produce a control voltage of value determined by the time interval between the pulses and sense determined by the order of the pulses; means to convert the control voltage to an alternating voltage of magnitude determined by the value of the control voltage and one phase position or the opposite phase position determined by the sense of the control voltage; a two phase servo motor energized in one phase by the last alternating voltage and in the other phase by a quadrature alternating voltage of like frequency; and means to vary the phase of the voltage of said first means in accord with the extent of the rotation of the servo motor and in direction to restore the shaft to predetermined phase position.

3. A system to maintain a rotating shaft at a predetermined phase position in relation to periodic timing pulses, comprising in combination: a synchronous drive motor for the shaft; a source of polyphase driving voltage for the motor; a synchro having a relatively movable rotor and stator with polyphase windings interposed between the source and the drive motor to supply the latter with polyphase voltage of controllable phase position; means to produce a pulse each time the shaft passes a predetermined phase position; means to compare the last signal with the periodic timing pulse and produce a control voltage of value determined by the time interval between the pulses and sense determined by the order of the pulses; and means to vary the position of the synchro rotor in relation to the synchro stator in accord with the value of the control voltage and in direction to advance or retract the phase position of the voltage applied to the motor in direction to restore the shaft to predetermined phase position.

4. A system to maintain a rotating shaft at a predetermined phase position in relation to periodic timing pulses, comprising in combination: a synchronous drive motor for the shaft; means to supply polyphase A.-C. of adjustable phase to the motor; means to produce a pulse each time the shaft passes a predetermined phase position; means to compare the last pulses with the periodic timing pulses and produce a control voltage of value determined by the time interval between the pulses and sense determined by the order of the pulses; and means to vary the phase position of the voltage of said first means in accord with the value of the control voltage and in direction to restore the shaft to predetermined phase position.

5. In a comparator to produce a pulse of duration determined by the spacing of control pulses from a pair of sources and appearing at one or the other of a pair of output terminals in accord with the sequence of the control pulses: a pair of bistable control devices, one connected to each of said output terminals to energize the same when in one condition; means to apply one control pulse to one control device to trigger the same to the output terminal energizing condition and to the other control device to trigger the same to the output terminal non-energizing condition; means to apply the other control pulse to the other control device to trigger the same to the output terminal energizing condition and to the one control device to trigger the same to the output terminal non-energizing condition; and means responsive to the change of either control device to the output terminal energizing condition to disable the other control device.

6. In a comparator to produce a pulse of duration determined by the spacing of pairs of periodic control pulses from a pair of sources and appearing at one or the other of a pair of output terminals in accord with the sequence of the control pulses: a pair of bistable control devices, one connected to each of said output terminals to energize the same when in one condition; means operable to trigger both control devices to the output terminal non-energizing condition approximately midway between successive pulses from one source; means to apply one control pulse to one control device to trigger the same to the output terminal energizing condition and to the other control device to trigger the same to the output terminal non-energizing condition; means to apply the other control pulse to the other control device to trigger the same to the output terminal energizing condition and to the one control device to trigger the same to the output terminal non-energizing condition; and means responsive to the change of either control device to the output terminal energizing condition to disable the other control device.

7. A system to maintain a rotating shaft at a predetermined phase position in relation to periodic timing pulses comprising in combination: means to create a control pulse each time the shaft passes a predetermined phase position; a pair of bistable control devices, each having an output terminal and adapted to energize the same when in one condition; means to apply the timing pulses to one control device to trigger the same to the output terminal energizing condition and to the other control device to trigger the same to the output terminal non-energizing condition; means to apply the controlled pulses to the other control device to trigger the same to the output terminal energizing condition and to the one control device to trigger the same to the output terminal non-energizing condition; means responsive to the change in either control device to the output terminal energizing condition to disable the other control device; and means to increase the rotational velocity of the shaft when the output terminal of one control device is energized and to reduce the rotational velocity of the shaft when the output terminal of the other control device is energized, the whole forming a closed cycle control system to maintain the shaft in predetermined phase position.

8. A system to maintain a rotating shaft at a predetermined phase position in relation to periodic timing pulses comprising in combination: means to create a control pulse each time the shaft passes a predetermined phase position; a pair of bistable control devices, each having an output terminal and adapted to energize the same when in one condition; means operable to trigger both control devices to the output terminal non-energizing condition approximately midway between successive pulses of one of said series; means to apply the timing pulses to one control device to trigger the same to the output terminal energizing condition and to the other control device to trigger the same to the output terminal non-energizing condition; means to apply the controlled pulses to the other control device to trigger the same to the output terminal energizing condition and to the one control device to trigger the same to the output terminal non-energizing condition; means responsive to the change in either control device to the output terminal energizing condition to disable the other control device; and means to increase the rotational velocity of the shaft when the output terminal of one control device is energized and to reduce the rotational velocity of the shaft when the output terminal of the other control device is energized, the whole forming a closed cycle control system to maintain the shaft in predetermined phase position.

9. A multivibrator mechanism to maintain a rotating shaft in predetermined phase position in relation to periodic timing pulses, comprising in combination: a pair of bistable multivibrators each having a terminal at which voltage is produced when in one condition; means to produce a controlled voltage pulse each time the shaft passes a predetermined phase position; means to apply the controlled pulses to one multivibrator to trigger the same to said one condition; means to apply the periodic timing pulses to the other multivibrator to trigger the same to said one condition; means responsive to the said one condition of the other multivibrator to disable said second means and responsive to the said one condition of the one multivibrator to disable said third means; means to apply the controlled pulses to the other multivibrator to trigger the same from said one condition and to apply the periodic timing pulses to the one multivibrator to trigger the same from said one condition; and means to accelerate said shaft when the said terminal of one multivibrator is energized and to decelerate said shaft when said terminal of the other multivibrator is energized, the whole forming a closed cycle control system to maintain predetermined phase position of the shaft.

10. A multivibrator mechanism to main a rotating shaft in predetermined phase position in relation to periodic timing pulses, comprising in combination: a pair of bistable multivibrators each having a terminal at which voltage is produced when in one condition; means to produce a controlled voltage pulse each time the shaft passes a predetermined phase position; gate means disabled when one multivibrator has said one condition to apply the periodic timing pulses to the other multivibrator to trigger the same to said one condition; gate means disabled when the other multivibrator has said one condition to apply the controlled voltage pulses to the one multivibrator to trigger the same to said one condition; means to apply the controlled voltage pulses to the other multivibrator to trigger the same from said one condition and to apply the periodic timing pulses to the one multivibrator to trigger the same from said one condition; and means to accelerate said shaft when the said terminal of one multivibrator is energized and to decelerate said shaft when said terminal of the other multivibrator is energized, the whole forming a closed cycle control system to maintain predetermined phase position of the shaft.

11. A multivibrator mechanism to maintain a rotating shaft in predetermined phase position in relation to periodic timing pulses, comprising in combination: a pair of bistable multivibrators each having a terminal at which voltage is produced when in one condition; means to produce a controlled voltage pulse each time the shaft passes a predetermined phase position; gate means disabled when one multivibrator has said one condition to apply the periodic timing pulses to the other multivibrator to trigger the same to said one condition; gate means disabled when the other multivibrator has said one condition to apply the controlled voltage pulses to the one multivibrator to trigger the same to said one condition; means to apply the controlled voltage pulses to the other multivibrator to trigger the same from said one condition and to apply the periodic timing pulses to the one multivibrator to trigger the same from said one condition; means to generate a series of pulses approximately midway between the successive pulses of one series; means to apply the pulses of said last series to both multivibrators to trigger the same from said one condition; and means to accelerate said shaft when the said terminal of one multivibrator is energized and to decelerate said shaft when said terminal of the other multivibrator is energized, the whole forming a closed cycle control system to maintain predetermined phase position of the shaft.

References Cited in the file of this patent

UNITED STATES PATENTS

| | | |
|---|---|---|
| 1,999,646 | Wittkuhns | Apr. 30, 1935 |
| 2,402,055 | Kibler | June 11, 1946 |
| 2,460,638 | Gilbert | Feb. 1, 1949 |
| 2,538,494 | Barton | Jan. 16, 1951 |
| 2,601,516 | Gray | June 24, 1952 |
| 2,628,279 | Roe | Feb. 10, 1953 |
| 2,634,388 | Harshbarger | Apr. 7, 1953 |
| 2,636,983 | Poole | Apr. 28, 1953 |
| 2,695,558 | Hoeppner | Dec. 7, 1954 |